(12) United States Patent  
Kamikubo et al.

(10) Patent No.: US 7,077,899 B2
(45) Date of Patent: Jul. 18, 2006

(54) PIGMENT DISPERSING AGENT, PIGMENT COMPOSITION CONTAINING THE SAME AND PIGMENT DISPERSION CONTAINING THE SAME

(75) Inventors: Takashi Kamikubo, Tokyo (JP); Daisuke Tanabe, Tokyo (JP); Tetsuya Sai, Tokyo (JP)

(73) Assignee: Toyo Ink Mfg. Co. Ltd., Tokyo (JP)

( * ) Notice: Subject to any disclaimer, the term of this patent is extended or adjusted under 35 U.S.C. 154(b) by 113 days.

(21) Appl. No.: 10/756,350

(22) Filed: Jan. 14, 2004

(65) Prior Publication Data

US 2004/0147633 A1 Jul. 29, 2004

(30) Foreign Application Priority Data

Jan. 17, 2003 (JP) .................. 2003-8992

(51) Int. Cl.
*C09D 11/02* (2006.01)
*C09D 11/10* (2006.01)
*C08K 5/3492* (2006.01)

(52) U.S. Cl. ............... 106/498; 106/413; 106/476; 106/493; 106/494; 106/495; 106/496; 106/497; 106/499; 524/100; 544/7

(58) Field of Classification Search ............ 106/413, 106/476, 493, 494, 495, 496, 497, 498, 499; 524/100
See application file for complete search history.

(56) References Cited

U.S. PATENT DOCUMENTS

| 4,742,161 A | 5/1988 | Doré |
| 5,112,404 A | 5/1992 | Sommer et al. |
| 5,786,459 A | 7/1998 | Stöhr et al. |
| 6,123,763 A | 9/2000 | Kamikubo et al. |

FOREIGN PATENT DOCUMENTS

| EP | 0 290 384 A2 | 11/1988 |
| EP | 0 308 800 | 3/1989 |
| EP | 0 570 838 A1 | 11/1993 |
| EP | 0 710 706 A2 | 5/1996 |
| EP | 1 022 273 A1 | 7/2000 |
| EP | 1 217 045 A1 | 6/2002 |
| WO | 02/30913 A1 | 4/2002 |
| WO | 02/46316 A1 | 6/2002 |

*Primary Examiner*—Anthony J. Green
(74) *Attorney, Agent, or Firm*—Wenderoth, Lind & Ponack, L.L.P.

(57) ABSTRACT

A pigment dispersing agent of the formula (1) capable of providing a printing ink or a coating composition excellent in fluidity and dispersion stability and a dry coating excellent in gloss, a pigment composition containing the same and a pigment dispersion containing the same,

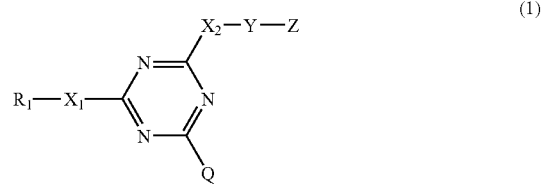

(1)

wherein $X_1$ is —NH—, —O—, —CONH—, —SO$_2$NH—, —CH$_2$NH—, —CH$_2$NHCOCH$_2$NH— or —X$_3$—Y—X$_4$—, $X_2$ and $X_4$ are —NH— or —O—, $X_3$ is —CONH—, —SO$_2$NH—, —CH$_2$NH—, —NHCO— or —NHSO$_2$—, Y is an alkylene group, an alkenylene group or an arylene group, Z is —SO$_3$M or —COOM, $R_1$ is a heterocyclic ring residue or an aromatic ring residue, Q is —O—$R_2$, —NH—$R_2$, a halogen group, —$X_1$—$R_1$ or —$X_2$—Y-Z, $R_2$ is a hydrogen atom, an alkyl group or an alkenyl group, and M is one equivalent of a monovalent to trivalent cation.

3 Claims, No Drawings

PIGMENT DISPERSING AGENT, PIGMENT COMPOSITION CONTAINING THE SAME AND PIGMENT DISPERSION CONTAINING THE SAME

FIELD OF THE INVENTION

The present invention relates to a pigment dispersing agent excellent in suitability in use, particularly excellent in non-flocculation, non-crystallizability and fluidity. More specifically, it relates to a pigment dispersing agent capable of providing a printing ink or a coating composition excellent in fluidity and dispersion stability and providing a dry coating excellent in gloss, a pigment composition containing the same and a pigment dispersion containing the same.

PRIOR ARTS OF THE INVENTION

In a printing ink or a coating composition, a pigment is dispersed in a fine state and thus a printed matter or an applied product has suitability such as a clear color tone and gloss. Further, when a pigment is dispersed in a stable state, a printing ink or coating composition is improved in fluidity and thus improved in printability and, in addition, labor or energy for producing the printing ink or coating composition can be largely reduced. Furthermore, a dispersion in a stable state is generally excellent in shelf life.

However, most of pigments used in a printing ink or a coating composition have a fine particle size for achieving a clearer color tone so that the aggregation strength between pigment particles strengthens. Therefore, it is difficult to provide the above properties in many cases.

For overcoming these problems, it is known that a pigment dispersing agent is used for improving the affinity between pigment and a vehicle so as to stabilize a dispersion. Many proposals of pigment dispersing agents have been so far published.

For example, as is typically disclosed in Japanese Patent Publication No. 41-2466 and U.S. Pat. No. 2,855,403, there are known methods of incorporating compounds obtained by introducing a side-chain substituent selected from sulfonic acid, a sulfoneamide group, an aminomethyl group or a phthalimidemethyl group into an organic pigment as a matrix structure. These compounds have a high effect on the non-flocculation and the stability against crystallization. Since, however, the compound which is to be incorporated is derived from a compound having the same chemical structure as the structure of a pigment, it has inherent intense coloring properties and is therefore extremely limited when applied to a pigment having a different hue. It is therefore required to provide compounds corresponding to individual pigments, which requirement is appreciably disadvantageous for producing pigment compositions. Further, since these compounds have properties near to those of a dye, these compounds are inferior intolerance to pigments in some cases. When pigment compositions containing these compounds are used to obtain an ink or a coating composition, the hue of the compounds discolors with the passage of time, etc., and the hue of a coating changes in some cases. Further, after the formation of a coating, these compounds come up by a high temperature treatment such as boiling or baking or by pressure-bonding and the hue transfers in some cases.

Further, JP-A-8-127749 and JP-A-11-199796 disclose triazine-ring-containing basic compounds. These compounds exhibit an effect on a binder having an acid functional group such as an acrylic resin or an alkyd resin, while the effect is not sufficient. These compounds exhibit almost no effect on a binder having a basic functional group such as a polyurethane resin or a polyamide resin. Particularly, these compounds exhibit completely no effect on a polyurethane resin having high basicity and containing a urea bond used for a gravure ink or the like.

SUMMARY OF THE INVENTION

It is an object of the present invention to provide a pigment dispersing agent capable of providing a printing ink or a coating composition excellent in fluidity and dispersion stability and a dry coating excellent in gloss, a pigment composition containing the above pigment dispersing agent and a pigment dispersion containing the pigment dispersing agent.

It is another object of the present invention to provide a pigment dispersing agent capable of dispersing a pigment excellently by using a colorless or slightly colored specific compound having no pigment structure, a pigment composition containing the above pigment dispersing agent and a pigment dispersion containing the pigment dispersing agent.

According to the present invention, there is provided a pigment dispersing agent of the formula (1),

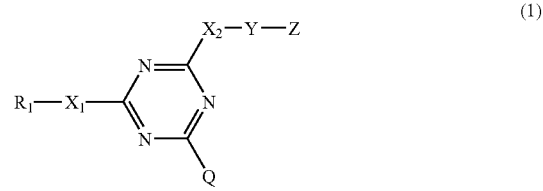

wherein $X_1$ is —NH—, —O—, —CONH—, —SO$_2$NH—, —CH$_2$NH—, —CH$_2$NHCOCH$_2$NH— or —X$_3$—Y—X$_4$—, each of $X_2$ and $X_4$ is independently —NH— or —O—, $X_3$ is —CONH—, —SO$_2$NH—, —CH$_2$NH—, —NHCO— or —NHSO$_2$—, Y is an alkylene group which has 20 or less carbon atoms, preferably 1 to 20 carbon atoms, and may have a substituent, an alkenylene group which has 20 or less carbon atoms, preferably 2 to 20 carbon atoms, and may have a substituent, or an arylene group which has 20 or less carbon atoms and may have a substituent, Z is —SO$_3$M or —COOM, $R_1$ is a heterocyclic ring residue which may have a substituent, an aromatic ring residue which may have a substituent, or a group represented by the formula (2), Q is —O—R$_2$, —NH—R$_2$, a halogen group, —X$_1$—R$_1$ or —X$_2$—Y-Z, $R_2$ is a hydrogen atom, an alkyl group which may have a substituent or an alkenyl group which may have a substituent, and M is one equivalent of a monovalent to trivalent cation,

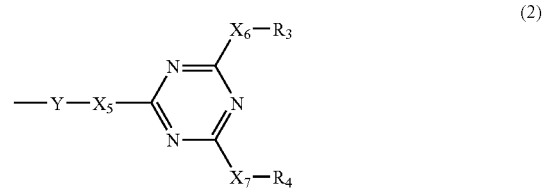

wherein $X_5$ is —NH— or —O—, each of $X_6$ and $X_7$ is independently —NH—, —O—, —CONH—, —SO$_2$NH—, —CH$_2$NH— or —CH$_2$NHCOCH$_2$NH—, each of $R_3$ and $R_4$ is independently a heterocyclic ring residue which may have a substituent, an aromatic ring residue which may have a substituent, or —Y-Z and Y and Z have the same meanings as those in the formula (1).

According to the present invention, further, there is provided a pigment composition containing a pigment and the above pigment dispersing agent and optionally containing a resin type pigment dispersing agent having a weight average molecular weight of 1,000 to 100,000.

According to the present invention, further, there is provided a pigment dispersion obtainable by dispersing the above pigment composition in a non-aqueous vehicle.

DETAILED DESCRIPTION OF THE INVENTION

The present invention will be explained in detail hereinafter.

The pigment dispersing agent of the present invention has a heterocyclic ring and/or an aromatic ring and an acid functional group represented by Z in the formula (1) and a triazine ring.

Examples of the heterocyclic ring residue or the aromatic ring residue, represented by $R_1$ in the formula (1) and $R_3$ and $R_4$ in the formula (2), include thiophene, furan, pyridine, pyrazole, pyrrole, imidazole, isoindolin, isoindolinone, benzimidazolone, benzthiazole, benztriazole, indole, quinoline, carbazole, acridine, benzen, naphthalene, anthracene, fluorene and phenanthrene.

Y in the formula (1) and formula (2) represents an alkylene group, an alkenylene group or an arylene group each of which has 20 or less carbon atoms and may have a substituent. The arylene group is preferably a substituted or non-substituted phenylene group, a substituted or non-substituted biphenylene group or a substituted or non-substituted naphthylene group. The alkylene group is preferably a group which may have a side chain and has 10 or less carbon atoms.

$R_2$ contained in Q in the formula (1) is an alkyl group or an alkenyl group each of which may have a substituent, and The alkyl group or the alkenyl group preferably has 20 or less carbon atoms. More preferably, it is an alkyl group which may have a side chain and has 10 or less carbon atoms. The alkyl group or alkenyl group having a substituent refers to an alkyl or alkenyl group of which the hydrogen atom is replaced with a halogen atom such as a fluorine atom, a chlorine atom or a bromine atom, a hydroxyl group, a mercapto group, or the like.

A compound used for forming —$X_2$—Y-Z in the formula (1) is represented by the formula (3) and the formula (4),

$$H_2N—Y-Z \quad (3)$$

(wherein Y and Z have the same meanings as those in the formula (1))

$$HO—Y-Z \quad (4)$$

(wherein Y and Z have the same meanings as those in the formula (1)).

Examples of the above compounds include aminomethanesulfonic acid, aminoethanesulfonic acid, aminobenzenesulfonic acid, 4-aminotoluene-2-sulfonic acid, aminonaphthalenesulfonic acid, aminoacetic acid, aminopropionic acid, aminobutyric acid, aminocaproic acid, aminobenzoic acid, aminonaphthoic acid, 2-oxyethane-1-sulfonic acid, p-hydroxybenzenesulfonic acid, 2-naphthol-6-sulfonic acid, hydroxybutyric acid, 12-hydroxystearic acid, 2-hydroxybenzoic acid, 4-hydroxybenzoic acid, 3-hydroxy-2-naphthoic acid, etc.

M in the formula (1) is one equivalent of a monovalent to trivalent cation. For example, it is a hydrogen atom, various metals or quarternary ammonium salt.

The various metals include sodium, potassium, calcium, barium, magnesium, aluminum, nickel, cobalt, etc.

An ammonium cation includes dimethyl ammonium, trimethyl ammonium, diethyl ammonium, triethyl ammonium, hydroxyethyl ammonium, dihydroxyethyl ammonium, 2-ethylhexyl ammonium, dimethylaminopropyl ammonium, lauryl ammonium, stearyl ammomium, etc.

The pigment dispersing agent of the present invention can be produced, for example, by the following method. First, an aromatic or heterocyclic compound having an amino group, such as aniline, naphthyl amine, 4-aminopyridine, 5-aminobenzimidazolone, 2-aminobenzothiazole or 3-amino-9-ethylcarbazole, is reacted with cyanuric chloride in water, an acetic acid aqueous solution, alcohol, a water-alcohol mixed solvent or a general organic solvent such as xylol. In this reaction, the aromatic or heterocyclic compound is used in an amount of about 1 mol to 2 mol based on 1 mol of the cyanuric chloride. Then, for forming —$X_2$—Y-Z in the formula (1), the before-mentioned compounds of the formula (3) and the formula (4) are allowed to react in water or a general organic solvent, whereby the pigment dispersing agent of the formula (1), provided by the present invention, can be produced.

A metal salt compound represented by the formula (1) can be obtained by adding a powder or an aqueous solution of a hydrochloride, a sulfate, a nitrate, etc., of a metal into a slurry of a sulfonic or carboxylic acid compound, obtained by the above procedures, in water or an organic solvent, and stirring the resultant mixture, followed by filtration, washing with water and drying. In this case, the hydrochloride, the sulfate, the nitrate, etc., of a metal is added in an amount of a little over 1 mol based on 1 mol of the sulfonic or carboxylic acid.

A quaternary ammonium salt compound represented by the formula (1) can be obtained by adding alkylamine or alkylamonium salt or a solution of alkylamine or alkylamonium salt in water or an organic solvent into a slurry of a sulfonic or carboxylic acid compound, obtained by the above procedures, in water or an organic solvent, and stirring the resultant mixture, followed by filtration, washing with water and drying.

The pigment dispersing agent obtained in the present invention exhibits excellent effects on all of pigments generally used for a printing ink or a coating composition. It can be applied, for specific example, to organic pigments such as a soluble azo pigment, an insoluble azo pigment, a phthalocyanine pigment, a quinacridone pigment, an isoindolinone pigment, a perylene pigment, a perinone pigment, a dioxadine pigment, an anthraquinone pigment, a dianthraquinonyl pigment, an anthrapyrimidine pigment, an anthanthrone pigment, an indanthrone pigment, a flavanthrone pigment, a pyranthrone pigment and a diketopyrrolopyrrole pigment, and all kinds of carbon black pigments which are usually used as a coloring material.

The pigment dispersing agent of the present invention has a colorless or slightly colored hue, so that it is advantageous in that it causes almost no change in hue when added to a variety of pigments and is excellent in versatility.

The pigment composition of the present invention is a composition containing a pigment and the pigment dispersing agent of the general formula (1) and optionally containing a resin type pigment dispersing agent.

The resin type pigment dispersing agent used in the pigment composition of the present invention is formed of a polyester type, acrylic type or urethane type macromolecular copolymer as disclosed in JP-A-60-166318, JP-A-61-174939, JP-A-46-7294 and JP-A-9-169821 and has a weight average molecular weight of 1,000 to 100,000.

When the weight average molecular weight of the resin type pigment dispersing agent is less than 1,000, sufficient steric hindrance can not be obtained so that a dispersing effect decreases. When the weight average molecular weight is larger than 100,000, undesirably, an aggregation effect occurs inversely in some cases.

Further, the resin type pigment dispersing agent preferably has an amine value of 5 to 200 mgKOH/g. When the amine value is less than 5 mgKOH/g, an interaction with the pigment dispersing agent of the present invention is not sufficient. Even when the pigment dispersing agent of the present invention adsorbs to a pigment surface, a sufficient dispersing effect can not be obtained in some cases. On the other hand, when the amine value of the resin type pigment dispersing agent is larger than 200 mgKOH/g, undesirably, a steric hindrance layer decreases as compared with a portion having affinity with pigment component so that a sufficient dispersing effect can not be obtained.

The resin type pigment dispersing agent can be selected from commercially available ones. Examples thereof include Solsperse 24000 (supplied by Avecia KK), Disperbyk-160, Disperbyk-161, Disperbyk-162, Disperbyk-163, Disperbyk-170 (supplied by BYK-Chemie), AJISPER PB-711, AJISPER PB-821 (supplied by Ajinomoto Fine-Techno Co., Inc.), etc.

The amount of the pigment dispersing agent of the formula (1) per 100 parts by weight of the pigment is preferably 0.5 to 30 parts by weight. The amount of the resin type pigment dispersing agent per 100 parts by weight of the pigment is preferably 0.5 to 100 parts by weight.

When the amount of the pigment dispersing agent of the formula (1) and the amount of the resin type pigment dispersing agent are respectively less than 0.5 part by weight, undesirably, the effect of dispersing a pigment is low. When the amount of the pigment dispersing agent of the formula (1) exceeds 30 parts by weight, no further effect can be obtained. When the amount of the resin type pigment dispersing agent exceeds 100 parts by weight, no effect can be obtained and, in addition, the physical properties of a coating decreases in some cases.

The pigment dispersing agent of the present invention is used, for example, by the following methods.

1. A pigment and the pigment dispersing agent are mixed to obtain a pigment composition in advance, and the pigment composition is dispersed in a non-aqueous vehicle.

2. A pigment and the pigment dispersing agent are separately added to a non-aqueous vehicle, and then dispersed.

3. A pigment is dispersed in a non-aqueous vehicle, the pigment dispersing agent is dispersed in a separate non-aqueous vehicle, and the resultant dispersions are mixed. In this case, the pigment dispersing agent may be dispersed in a solvent alone.

4. A pigment is dispersed in a non-aqueous vehicle to prepare a pigment dispersion, and the pigment dispersing agent is added to the pigment dispersion.

The intended effect can be obtained by any one of the above methods.

In the preparation of the pigment composition, the dispersing effect can be fully obtained by simply mixing a pigment powder and the pigment dispersing agent of the present invention, while superior results can be obtained by mechanically mixing a pigment and the pigment dispersing agent with a kneader, a roll, an attritor, a super mill or other pulverizer, by adding a solution containing the pigment dispersing agent of the present invention to a suspension of a pigment in water or an organic solvent to deposit pigment dispersing agent on the surface of each pigment particle, or by co-dissolving an organic pigment and the pigment dispersing agent in a solvent having high dissolving power such as sulfuric acid and co-precipitating them in a bad solvent such as water.

Further, when a pigment or the pigment dispersing agent is dispersed in, or mixed with, anon-aqueous vehicle or a solvent, a dispersing machine such as a dissolver, a high-speed mixer, a homo-mixer, a kneader, a roll mill, a sand mill or an attritor maybe used, and in this case, the pigment can be well dispersed.

According to the present invention, therefore, an excellent fluidity such as a decrease in the viscosity of a dispersion and a decrease in structural viscosity is exhibited as compared with a case using a pigment alone in a non-aqueous vehicle for a gravure ink such as a lime rosin varnish, a polyamide resin varnish or a vinyl chloride resin varnish, an ordinary-drying or baking coating composition such as a nitrocellulose lacquer or an aminoalkyd resin, an acryl lacquer, an aminoacrylic resin baking coating composition or a urethane resin coating composition. At the same time, there is no problem such as color separation or a change in crystal, and a printed product and a coating have excellent gloss so that aesthetically fine products can be obtained.

The pigment dispersing agent and the pigment composition of the present invention are not limited to a mixture with a non-aqueous vehicle, and have an excellent dispersing effect and give a colored material having high tinting strength when mixed with other printing ink or coating composition, including aqueous ones, or when used to color plastics. Further, the pigment dispersing agent and the pigment composition of the present invention are effective on applications such as a magnetic coating composition, a color filter, an inkjet, etc., each of which is required to have a high pigment dispersion degree.

A resin used in the pigment dispersion of the present invention may be any one selected from resins used for general coating compositions or inks. Examples thereof include nitrocellulose, acetic acid cellulose, ethyl cellulose, a urethane resin, a polyamide resin, a polyvinyl butyral resin, an acrylic resin, a polyester resin, an alkyd resin, lime rosin, toll oil rosin, wood rosin, rosin ester, and rosin-modified phenol, a petroleum resin, linseed oil, tung oil, soybean oil, a maleic acid resin, a vinyl resin, cyclized rubber, chlorinated rubber, an ethylene-vinyl acetate resin, gilsonite, dammar, shellac, an epoxy resin, vinyl chloride, a silicon resin, a melamine resin, a urea resin, a benzoguanamine resin, etc. Of these, a urethane resin having a molecular weight of 5,000 to 100,000, usually used as a binder for an ink or the like, is a resin in which a pigment is hardly dispersed and a conventional pigment dispersing agent exhibits almost no effect on it. However, when the pigment dispersing agent of the present invention is used, a specifically large effect can be obtained.

Further, as the resin used in the pigment dispersion of the present invention, the above resins can be used alone or in combination. When one or at least two of the above resins is/are used to prepare a pigment dispersion having a high concentration, the pigment dispersion may diluted with other resin.

The urethane resin, which is generally used as a binder for a printing ink, etc., has a main structure composed of a component obtained by a reaction between a polyhydroxy compound and polyisocyanate, while, in many cases, the urethane resin is often increased in molecular weight by a reaction called a chain-elongation reaction using one compound or at least two compounds selected from glycols, diamines, amino alcohols, etc., for the purpose of imparting performances as a binder. A urethane resin which has relatively strong basicity and is provided with one or more urea bond(s) per molecule by carrying out a chain-elongation reaction using diamines or amino alcohols, is particularly effective as a resin used in the pigment dispersion of the present invention.

The organic solvent used in the pigment dispersion of the present invention includes an aromatic hydrocarbon such as toluene, a petroleum hydrocarbon such as mineral spirit, a halogenated hydrocarbon such as chlorobenzene, ketones such as acetone, methyl ethyl ketone, methyl isobutyl ketone and cyclohexanone, esters such as ethyl acetate, butyl acetate, amyl acetate and 2-ethoxyethyl acetate, alcohols such as methanol, ethanol, propanol and butanol and cellosolves such as ethyl cellosolve and butyl cellosolve. Particularly preferred are organic solvents having a high polarity such as ketones, alcohols, cellosolves and esters. Of course, the organic solvents may be used alone or in combination.

The pigment composition or the pigment dispersion of the present invention can be used for a printing ink or a coating composition. As a vehicle for printing ink or an additive for coating composition used in the above case, there may be used an antifoamer, a leveling agent, an anti-blocking agent, a surfactant, a viscosity modifier, wax, etc.

EXAMPLES

The present invention will be explained with reference to Examples hereinafter. In Examples, "part" stands for "part by weight" and "%" stands for "% by weight".

Preparation Example 1

20 Parts of 5-aminobenzimidazolone and 25 parts of cyanuric chloride were added to 300 parts of methanol, and the mixture was allowed to react at 20° C. or lower for 2 hours. Then, 34 parts of aminoethanesulfonic acid, 27 parts of sodium hydroxide and 700 part of water were added, and the resultant mixture was refluxed under heat for 4 hours. Then, the mixture was cooled down to 60° C., 170 parts of 10% aluminum sulfate aqueous solution was added, and the resultant mixture was stirred at 60° C. for 1 hour, followed by filtration, washing with water and drying, to obtain 60 parts of a pigment dispersing agent (a) shown in Table 1.

p Preparation Example 2

40 Parts of 5-aminobenzimidazolone and 25 parts of cyanuric chloride were added to 500 parts of methanol, and the mixture was allowed to react at 50° C. for 2 hours. Then, 18 parts of 6-aminocaproic acid, 22 parts of sodium hydroxide and 1,000 part of water were added, and the mixture was refluxed under heat for 4 hours. Then, the mixture was cooled down to 60° C., 450 parts of 10% stearylamine acetate aqueous solution was added, and the resultant mixture was stirred at 60° C. for 1 hour, followed by filtration, washing with water and drying, to obtain 94 parts of a pigment dispersing agent (b) shown in Table 1.

Preparation Example 3

28 Parts of 3-amino-9-ethylcarbazole and 25 parts of cyanuric chloride were added to 300 parts of methanol, and the mixture was allowed to react at 20° C. or lower for 2 hours. Then, 21 parts of 5-aminosalicylic acid, 22 parts of sodium hydroxide and 700 part of water were added, and the mixture was allowed to react at 60° C. for 4 hours. Then, 1,000 part of water and 100 parts of 35% hydrochloric acid were added, and the mixture was refluxed under heat for 4 hours, followed by filtration, washing with water and drying, to obtain 55 parts of a pigment dispersing agent (c) shown in Table 1.

Preparation Example 4

23 Parts of p-aminobenzenesulfonic acid, 25 parts of cyanuric chloride and 5 parts of sodium hydroxide were added to 300 parts of methanol and 300 part of water, and the mixture was allowed to react at 20° C. or lower for 2 hours. Then, 14 parts of p-toluidine was added, and the mixture was allowed to react at 60° C. for 2 hours. Then, 22 parts of 3,3'-dichlorobenzidine hydrochloride was added, and the mixture was refluxed under heat for 4 hours. Then, the mixture was cooled down to 60° C., 80 parts of 10% potassium hydroxide aqueous solution was added, and the resultant mixture was stirred at 60° C. for 1 hour, followed by filtration, washing with water and drying, to obtain 64 parts of a pigment dispersing agent (d) shown in Table 1.

Pigment dispersing agents (e) to (h) shown in Table 1 were synthesized in the similar manner.

TABLE 1

| Symbol of pigment dispersing agent | Structure of Pigment dispersing agent | Salt-forming material |
|---|---|---|
| (a) | [structure with benzimidazolone-NH-triazine bearing two NH(CH$_2$)$_2$SO$_3$H groups] | Aluminum |

TABLE 1-continued

| Symbol of pigment dispersing agent | Structure of Pigment dispersing agent | Salt-forming material |
|---|---|---|
| (b) | | Stearyl ammonium |
| (c) | | Nil |
| (d) | | Potassium |
| (e) | | Triethyl ammonium |
| (f) | | Lauryl ammonium |

TABLE 1-continued

| Symbol of pigment dispersing agent | Structure of Pigment dispersing agent | Salt-forming material |
|---|---|---|
| (g) | [chemical structure: benzimidazolone linked via NH to triazine with NH-phenyl-CH3-SO3H and NH-phenyl substituents] | Trimethyl lauryl ammonium |
| (h) | [chemical structure: naphthalene-CONH-phenyl-O-triazine with two NH-phenyl-COOH substituents] | Barium |

Examples 1–19 and Comparative Examples 1–9

Gravure inks were prepared as follows. 10 parts of a pigment composition containing one of the pigment dispersing agents (a) to (h) as shown in Table 2, 90 parts of a varnish for a gravure ink (nitrocellulose resin 17%, ethyl acetate 60%, methanol 15%, toluene 8%) and 300 parts of 3-mm glass beads were mixed and dispersed with a paint conditioner for 60 minutes. Further, each pigment alone was similarly dispersed without adding the pigment dispersing agents, whereby gravure inks were prepared as Comparative Examples. Each of the prepared inks was measured for viscosity with a B type viscosimeter (6 rpm), and each of the inks was applied to a film with a barcoater to obtain a dry coating. Table 2 shows results of the viscosity measurement and gloss values of the dry coatings. The gravure inks each of which contained one of the pigment dispersing agents of the present invention and any one of the pigments had a low viscosity and showed excellent fluidity, and they showed excellent coating gloss.

TABLE 2

| Example No. | Kind of pigment | Symbol of dispersing agent | Amount of dispersing agent (based on pigment) | Viscosity 6 rpm (mP · s) | Gloss 60 G (%) |
|---|---|---|---|---|---|
| Comparative Example 1 | C.I. Pigment Yellow 180 | — | — | 1,300 | 50 |
| Example 1 | (Benzimidazolone | a | 1% | 480 | 62 |
| Example 2 | pigment) | b | 3% | 220 | 72 |
| Example 3 | | g | 3% | 100 | 74 |
| Comparative Example 2 | C.I. Pigment Red 185 | — | — | 3,620 | 45 |
| Example 4 | (Benzimidazolone | a | 3% | 480 | 65 |
| Example 5 | pigment) | b | 5% | 350 | 68 |
| Example 6 | | g | 5% | 300 | 72 |
| Comparative Example 3 | C.I. Pigment Red 122 | — | — | 6,850 | 65 |
| Example 7 | (Quinacridone | c | 5% | 800 | 78 |
| Example 8 | pigment) | e | 7% | 650 | 80 |
| Comparative Example 4 | C.I. Pigment Violet 23 | — | — | 3,580 | 71 |
| Example 9 | (Dioxazine | c | 3% | 700 | 90 |
| Example 10 | pigment) | e | 5% | 510 | 92 |
| Comparative Example 5 | C.I. Pigment Yellow 14 | — | — | 3,720 | 55 |
| Example 11 | (Disazo pigment) | d | 10% | 900 | 70 |
| Comparative Example 6 | C.I. Pigment Blue 15:3 | — | — | 7,000 | 67 |
| Example 12 | (Phthalocyanine pigment) | g | 5% | 940 | 80 |
| Comparative Example 7 | C.I. Pigment Green 7 | — | — | 5,780 | 67 |
| Example 13 | (Phthalocyanine | b | 5% | 720 | 83 |
| Example 14 | pigment) | g | 5% | 550 | 85 |
| Comparative Example 8 | C.I. Pigment Red 146 | — | — | 6,600 | 65 |
| Example 15 | (Naphthol | f | 5% | 720 | 84 |
| Example 16 | pigment) | h | 5% | 1,250 | 80 |
| Comparative Example 9 | C.I. Pigment Black 7 | — | — | 6,080 | 68 |
| Example 17 | (Carbon | a | 3% | 530 | 84 |
| Example 18 | pigment) | b | 5% | 350 | 88 |
| Example 19 | | g | 5% | 280 | 90 |

Viscosity: Measured at 25° C. with a Brookfield type viscosimeter
Gloss: Gloss value at an incident angle of 60 degrees Examples 20–38 and Comparative Examples 10–22

Pigment dispersions were prepared as follows 20 parts of a pigment composition containing one of the pigment dispersing agents (a) to (h) as shown in Table 4, 80 parts of a varnish for a gravure ink (urethane resin 15%, ethyl acetate 65%, isopropyl alcohol 20%), 2 parts of a resin type pigment dispersing agent (AJISPER PB-821, supplied by Ajinomoto Fine-Techno Co., Inc.) and 300 parts of 3-mm glass beads were mixed and dispersed with a paint conditioner for 60 minutes. Further, each pigment alone and one of organic coloring matter dispersing agents (i) to (1) having a pigment structure shown in Table 3 were similarly dispersed, whereby pigment dispersions were prepared as Comparative Examples. As the above urethane resin, there was used a urea-bond-containing urethane resin having a weight average molecular weight of about 30,000 which resin was obtained by elongating, with isophoronediamine, a chain of a prepolymer which was obtained by condensation polymerization between polyester polyol, obtained by condensation polymerization between 3-methyl-1,5-pentanediol and adipic acid, and isophoronediisocyanate.

TABLE 3

| | Structure of Pigment dispersing agent | | | |
|---|---|---|---|---|
| Symbol of Pigment dispersing agent | Organic coloring matter residue | Structure of substituent | Salt-forming material | Number of substituents |
| (i) | C.I. Pigment Blue 15 | SO$_3$H | Lauryl ammonium | 1 |
| (j) | C.I. Pigment Red 122 | " | Lauryl ammonium | 2 |
| (k) | C.I. Pigment Violet 23 | " | Lauryl ammonium | 3 |

TABLE 3-continued

| | Structure of Pigment dispersing agent | | | |
|---|---|---|---|---|
| Symbol of Pigment dispersing agent | Organic coloring matter residue | Structure of substituent | Salt-forming material | Number of substituents |
| (l) | C.I. Pigment Yellow 14 | " | Lauryl ammonium | 1 |

Each of the prepared pigment dispersions was measured for viscosity with a Brookfield type viscosimeter (6 rpm). Further, a solvent (composed of ethyl acetate 70% and isopropyl alcohol 30%) was added to one of the prepared pigment dispersions, the mixture was adjusted so as to show 14 to 16 seconds with a zahn cup No. 4, to obtain a gravure ink, and the gravure ink was applied to a film with a barcoater to obtain a dry coating. Table 4 shows results of the viscosity measurement and gloss values of the dry coatings. The gravure inks each of which contained one of the pigment dispersing agents of the present invention and any one of the pigments had a low viscosity and showed excellent fluidity, and they showed excellent coating gloss. Further, one of the gravure inks was applied to a nylon film, the ink-applied surface of the nylon film was brought into intimate contact with a no-ink-applied nylon film to obtain a test piece, the test piece was boiled at 100° C. for 1 hour, and then the test piece was checked for the transferability of a hue to the no-ink-applied nylon film (bleeding test). As a result thereof, as shown in Table 4, the hues of the test pieces using the organic coloring matter dispersing agent moved to color the no-ink-applied nylon films, while the test pieces using the pigment dispersing agents of the present invention did not color the no-ink-applied nylon films.

TABLE 4

| Example No. | Kind of pigment | Symbol of dispersing agent | Amount of dispersing agent (based on pigment) | Viscosity 6 rpm (mP · s) | Gloss 60 G (%) | Bleeding test |
|---|---|---|---|---|---|---|
| CEx. 10 | C.I. Pigment Yellow 180 (Benzimidazolone pigment) | — | — | 38,400 | 43 | ○ |
| Ex. 20 | | a | 1% | 4,580 | 55 | ○ |
| Ex. 21 | | b | 3% | 1,600 | 68 | ○ |
| Ex. 22 | | g | 3% | 1,050 | 71 | ○ |
| CEx. 11 | C.I. Pigment Red 185 (Benzimidazolone pigment) | — | — | 56,200 | 40 | ○ |
| Ex. 23 | | a | 1% | 11,500 | 52 | ○ |
| Ex. 24 | | b | 5% | 5,500 | 62 | ○ |
| Ex. 25 | | g | 5% | 1,200 | 70 | ○ |
| CEx. 12 | C.I. Pigment Red 122 (Quinacridone pigment) | — | — | 52,500 | 50 | ○ |
| CEx. 13 | | j | 5% | 800 | 76 | x |
| Ex. 26 | | c | 5% | 1,000 | 75 | ○ |
| Ex. 27 | | e | 7% | 850 | 76 | ○ |
| CEx. 14 | C.I. Pigment Violet 23 (Dioxazine pigment) | — | — | 55,400 | 32 | ○ |
| CEx. 15 | | k | 5% | 1,500 | 87 | x |
| Ex. 28 | | c | 3% | 4,800 | 75 | ○ |
| Ex. 29 | | e | 5% | 2,000 | 85 | ○ |
| CEx. 16 | C.I. Pigment Yellow 14 (Disazo pigment) | — | — | 38,700 | 35 | ○ |
| CEx. 17 | | l | 5% | 1,050 | 77 | x |
| Ex. 30 | | d | 10% | 1,700 | 75 | ○ |
| CEx. 18 | C.I. Pigment Blue 15:3 (Phthalocyanine pigment) | — | — | 56,500 | 37 | ○ |
| CEx. 19 | | i | 5% | 1,270 | 80 | x |
| Ex. 31 | | g | 5% | 3,940 | 75 | ○ |

TABLE 4-continued

| Example No. | Kind of pigment | Symbol of dispersing agent | Amount of dispersing agent (based on pigment) | Viscosity 6 rpm (mP·s) | Gloss 60 G (%) | Bleeding test |
|---|---|---|---|---|---|---|
| CEx. 20 | C.I. Pigment | — | — | 35,800 | 42 | o |
| Ex. 32 | Green 7 | b | 3% | 800 | 78 | o |
| Ex. 33 | (Phthalocyanine pigment) | g | 3% | 650 | 81 | o |
| CEx. 21 | C.I. Pigment | — | — | 48,600 | 33 | o |
| Ex. 34 | Red 146 | f | 5% | 3,250 | 74 | o |
| Ex. 35 | (Naphthol pigment) | h | 5% | 8,900 | 70 | o |
| CEx. 22 | C.I. Pigment | — | — | 51,000 | 50 | o |
| Ex. 36 | Black 7 | a | 3% | 1,200 | 80 | o |
| Ex. 37 | (Carbon | b | 5% | 1,500 | 80 | o |
| Ex. 38 | pigment) | g | 5% | 1,100 | 82 | o |

Ex. = Example,
CEx. = Comparative Example
Viscosity: Measured at 25° C. with a Brookfield type viscosimeter
Gloss: Gloss value at an incident angle of 60 degrees
Bleeding test: o not-colored, x colored Furthermore, the pigment compositions containing the pigment dispersing agents (a) to (h) caused no aggregation when used in a coating composition of aminoalkyd, aminoacryl, etc., and they showed excellent fluidity and coating gloss.

EFFECT OF THE INVENTION

According to the use of the pigment dispersing agent of the present invention, there can be obtained an ink and a coating composition which are not only excellent in non-flocculation, non-crystallizability and fluidity but also excellent in the gloss and hue of a coating.

What is claimed is:

1. A pigment composition containing an organic pigment or a carbon black pigment, a resin pigment dispersing agent having a weight average molecular weight of 1,000 to 100,000 and a pigment dispersing agent of the formula (1),

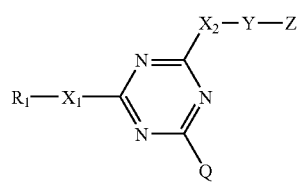

wherein $X_1$ is —NH—, —O—, —CONH—, —SO$_2$NH—, —CH$_2$NH—, —CH$_2$NHCOCH$_2$NH— or —X$_3$—Y—X$_4$—, each of $X_2$ and $X_4$ is independently —NH— or —O—, $X_3$ is —CONH—, —SO$_2$NH—, —CH$_2$NH—, —NHCO— or —NHSO$_2$—, Y is an alkylene group which has 20 or less carbon atoms and may have a substituent, an alkenylene group which has 20 or less carbon atoms and may have a substituent, or an arylene group which has 20 or less carbon atoms and may have a substituent, Z is —SO$_3$M or —COOM, $R_1$ is a heterocyclic ring residue which may have a substituent, an aromatic ring residue which may have a substituent, or a group represented by the formula (2), Q is —O—R$_2$, —NH—R$_2$, a halogen group, —X$_1$—R$_1$ or —X$_2$—Y-Z, $R_2$ is a hydrogen atom, an alkyl group which may have a substituent or an alkenyl group which may have a substituent, and M is one equivalent of a monovalent to trivalent cation,

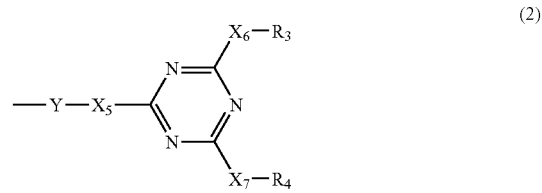

wherein $X_5$ is —NH— or —O—, each of $X_6$ and $X_7$ is independently —NH—, —O—, —CONH—, —SO$_2$NH—, —CH$_2$NH— or —CH$_2$NHCOCH$_2$NH—, each of $R_3$ and $R_4$ is independently a heterocyclic ring residue which may have a substituent, an aromatic ring residue which may have a substituent, or —Y-Z and Y and Z have the same meanings as those in the formula (1).

2. A pigment dispersion obtained by dispersing the pigment composition recited in claim 1 in a non-aqueous vehicle.

3. A pigment dispersion according to claim 2, wherein a resin in the non-aqueous vehicle is a urethane resin having a weight average molecular weight of 5,000 to 100,000 and having at least one urea bond per molecule.

* * * * *